United States Patent
Floyd et al.

(10) Patent No.: US 7,725,685 B2
(45) Date of Patent: *May 25, 2010

(54) INTELLIGENT SMT THREAD HANG DETECT TAKING INTO ACCOUNT SHARED RESOURCE CONTENTION/BLOCKING

(75) Inventors: Michael Stephen Floyd, Austin, TX (US); Larry Scott Leitner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/033,385

(22) Filed: Feb. 19, 2008

(65) Prior Publication Data

US 2008/0141000 A1    Jun. 12, 2008

Related U.S. Application Data

(63) Continuation of application No. 11/055,044, filed on Feb. 10, 2005, now Pat. No. 7,343,476.

(51) Int. Cl.
*G06F 9/30* (2006.01)
(52) U.S. Cl. .................... 712/216; 712/219
(58) Field of Classification Search ............ 712/216, 712/219, 220, 228, 229
See application file for complete search history.

(56) References Cited

U.S. PATENT DOCUMENTS

| | | | |
|---|---|---|---|
| 5,325,499 A | 6/1994 | Kummer et al. | |
| 6,543,003 B1 | 4/2003 | Floyd et al. | |
| 6,665,758 B1 | 12/2003 | Frazier et al. | |
| 6,757,811 B1* | 6/2004 | Mukherjee | 712/220 |
| 6,779,089 B2* | 8/2004 | Lin et al. | 711/152 |
| 6,854,051 B2* | 2/2005 | Mukherjee | 712/248 |
| 7,010,787 B2* | 3/2006 | Sakai | 717/159 |
| 7,278,063 B2* | 10/2007 | Billeci et al. | 714/45 |
| 2003/0131204 A1* | 7/2003 | Lin et al. | 711/152 |

* cited by examiner

*Primary Examiner*—Aimee J Li
(74) *Attorney, Agent, or Firm*—Yee & Associates, P.C.; Diana R. Gerhardt (57) ABSTRACT

Monitoring is performed to detect a hang condition. A timer is set to detect a hang based on a core hang limit. If a thread hangs for the duration of the core hang limit, then a core hang is detected. If the thread is performing an external memory transaction, then the timer is increased to a longer memory hang limit. If the thread is waiting for a shared resource, then the timer may be increased to the longer memory hang limit if another thread or, more particularly, the thread blocking the resource has a pending memory transaction. Responsive to detecting a hang condition, instructions dispatched to the plurality of execution units may be flushed, or the processor may be reset and restored to a previously known good, checkpointed architected state.

11 Claims, 5 Drawing Sheets

INTELLIGENT SMT THREAD HANG DETECT TAKING INTO ACCOUNT SHARED RESOURCE CONTENTION/BLOCKING

This application is a continuation of application Ser. No. 11/055,044, filed Feb. 10, 2005, now U.S. Pat. No. 7,343,476.

BACKGROUND OF THE INVENTION

1. Technical Field

The present invention relates generally to an improved data processing system and in particular to a method and apparatus for detecting a hang condition in a simultaneous multi-threading processor. Still more particularly, the present invention relates generally to an improved method and apparatus for intelligent hang detection taking into account shared resource contention/blocking.

2. Description of Related Art

Modern processors commonly use a technique known as pipelining to improve performance. Pipelining is an instruction execution technique that is analogous to an assembly line. Consider that instruction execution often involves sequential steps of fetching an instruction from memory, decoding the instruction into its respective operation and operand(s), fetching the operands of the instruction, applying the decoded operation on the operands (herein simply referred to as "executing" the instruction), and storing the result back in memory or in a register. Pipelining is a technique wherein the sequential steps of the execution process are overlapped for a sub-sequence of the instructions. For example, while the processor is storing the results of a first instruction of an instruction sequence, the processor simultaneously executes the second instruction of the sequence, fetches the operands of the third instruction of the sequence, decodes the fourth instruction of the sequence, and fetches the fifth instruction of the sequence. Pipelining can thus decrease the execution time for a sequence of instructions.

Another technique for improving performance involves executing two or more instructions from the same code stream in parallel, i.e., simultaneously. Processors that utilize this technique are generally referred to as superscalar processors. Such processors may incorporate an additional technique in which a sequence of instructions may be executed out of order. Results for such instructions must be reassembled upon instruction completion such that the sequential program order or results are maintained. This system is referred to as out-of-order issue with in-order completion.

Yet another technique for improving performance involves executing two or more code streams (called "processes" or "threads") simultaneously. While one thread is stalled waiting on a dependency or high latency operation (such as fetch from memory or an IO device), the other thread can make use of the otherwise idle circuits in the core (e.g. execution units). This is referred to as Simultaneous Multi-Threading (SMT) or by others in the industry as "hyperthreading."

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies, which are referred to as: resource conflicts, procedural dependencies, and data dependencies. Resource conflicts occur when two instructions executing in parallel tend to access the same resource, e.g., the system bus. Data dependencies occur when the completion of a first instruction changes the value stored in a register or memory, which is later accessed by a later completed second instruction.

During execution of instructions, an instruction sequence may fail to execute properly or to yield the correct results for a number of different reasons. For example, a failure may occur when a certain event or sequence of events occurs in a manner not expected by the designer. Further, a flaw in the design of a circuit or logic equation may cause an error. Due to the complexity of designing an out-of-order processor, the processor design may logically mis-process one instruction in combination with another instruction, causing an error. In some cases, a selected frequency, voltage, or type of noise may cause an error in execution because of a circuit not behaving as designed. Errors such as these often cause the scheduler in the microprocessor to "hang," resulting in execution of instructions coming to a halt.

Therefore, it would be advantageous to have a method and apparatus for properly detecting errors causing a microprocessor, in particular an SMT processor, to hang.

SUMMARY OF THE INVENTION

The present invention provides a method and apparatus for detecting and recovering from a hang condition in a processor having a plurality of threads (instruction streams) executing on a plurality of execution units. Monitoring is performed to detect a hang condition on each thread. A timer is set to detect a hang based on a core hang limit. If a thread hangs for the duration of the core hang limit, then a core hang is detected. If the thread is performing an external memory transaction, then the timer is increased to a longer memory hang limit. If the thread is waiting for a shared resource, then the timer may be increased to the longer memory hang limit if another thread or, more particularly, the thread blocking the resource has a pending memory transaction. Responsive to detecting a hang condition, instructions dispatched to the plurality of execution units may be flushed, or the processor may be reset and restored to a previously known good, checkpointed architected state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
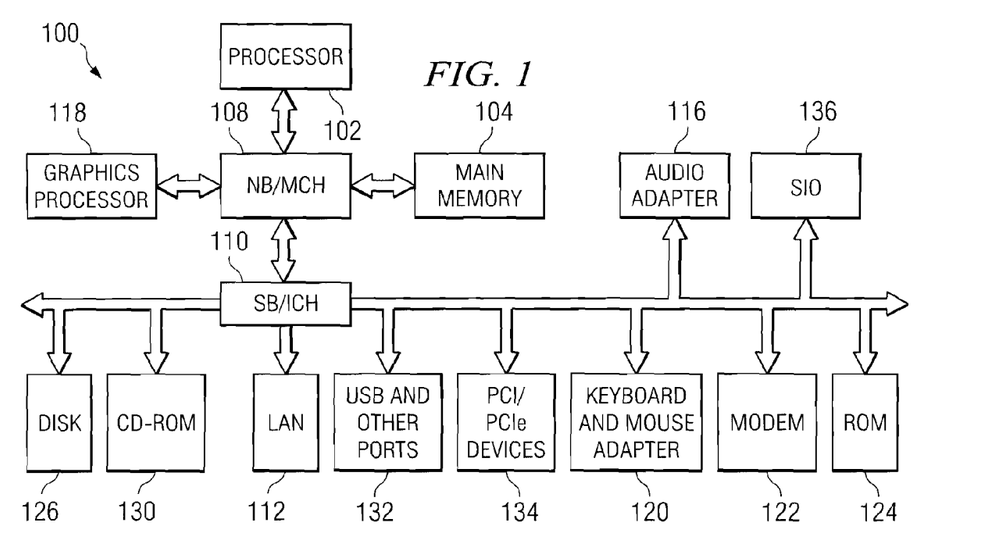
FIG. 1 is a block diagram of a data processing system in which the present invention may be implemented.
Figure 2:
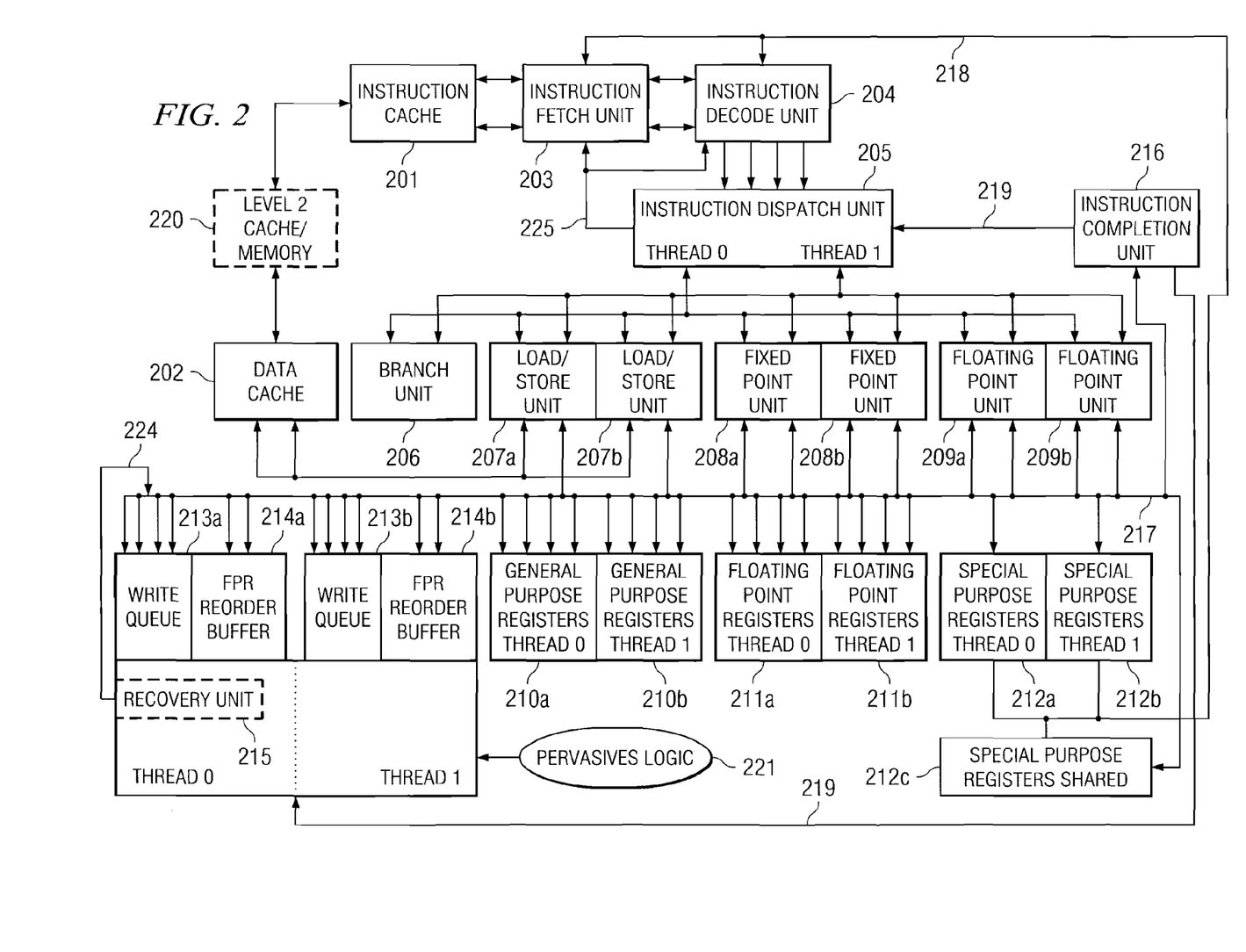
FIG. 2 is a block diagram of a processor system for processing information according to an exemplary embodiment of the present invention.

The present invention provides a method and apparatus for intelligent hang detection taking into account shared resource contention/blocking. The exemplary aspects of the present invention may be embodied within a processor, which is part of a data processing device that may be a stand-alone computing device or may be a distributed data processing system in which multiple computing devices are utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to FIG. 1, a block diagram of a data processing system is shown in which the present invention may be implemented. Data processing system 100 is an example of a computer in which exemplary aspects of the present invention may be located. In the depicted example, data processing system 100 employs a hub architecture including a north bridge and memory controller hub (MCH) 108 and a south bridge and input/output (I/O) controller hub (ICH) 110. Processor 102, main memory 104, and graphics processor 118 are connected to MCH 108. Graphics processor 118 may be connected to the MCH through an accelerated graphics port (AGP), for example.

In the depicted example, local area network (LAN) adapter 112, audio adapter 116, keyboard and mouse adapter 120, modem 122, read only memory (ROM) 124, hard disk drive (HDD) 126, CD-ROM driver 130, universal serial bus (USB) ports and other communications ports 132, and PCI/PCIe devices 134 may be connected to ICH 110. PCI/PCIe devices may include, for example, Ethernet adapters, add-in cards, PC cards for notebook computers, etc. PCI uses a cardbus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to ICH 110.

An operating system runs on processor 102 and is used to coordinate and provide control of various components within data processing system 100 in FIG. 1. The operating system may be a commercially available operating system such as Windows XP, which is available from Microsoft Corporation Instructions for the operating system and applications or programs are located on storage devices, such as hard disk drive 126, and may be loaded into main memory 104 for execution by processor 102. The processes of the present invention are performed by processor 102 using computer implemented instructions, which may be located in a memory such as, for example, main memory 104, memory 124, or in one or more peripheral devices 126 and 130.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a multiprocessor data processing system.

For example, data processing system 100 may be a personal digital assistant (PDA), which is configured with flash memory to provide non-volatile memory for storing operating system files and/or user-generated data. The depicted example in FIG. 1 and above-described examples are not meant to imply architectural limitations. For example, data processing system 100 also may be a tablet computer, laptop computer, or telephone device in addition to taking the form of a PDA.

FIG. 2 is a block diagram of a processor system for processing information according to an exemplary embodiment of the present invention. In one preferred embodiment, processor 200 is a single integrated circuit superscalar microprocessor with dual-thread SMT. While a dual-thread SMT architecture is shown, processor 200 may be configured to support any number of threads. Accordingly, as discussed further herein, processor 200 includes various units, registers, buffers, memories, and other sections, all of which are formed by integrated circuitry. Also, in the preferred embodiment, processor 200 may operate according to reduced instruction set computer (RISC) techniques.

As shown in FIG. 2, Instruction Fetch Unit 203 (IFU) is connected to an instruction cache 201. Instruction cache 201 holds instructions for multiple programs (threads) to be executed. Instruction cache 201 also has an interface to a second level cache and memory 220. IFU 203 requests instructions from instruction cache 201, according to an instruction address, and passes instructions to Instruction Decode Unit 204. In an exemplary embodiment, IFU 203 can request multiple instructions from instruction cache 201 for up to two threads at the same time, although more than two threads may be supported in alternative embodiments. Instruction decode unit 204 decodes multiple instructions for up to two threads at the same time and passes decoded instructions to Instruction Dispatch Unit 205 (IDU). IDU 205 selectively groups decoded instructions from Instruction Decode Unit 204 for each thread, and outputs a group of instructions for each thread to other execution circuitry of the processor.

The execution circuitry of the processor includes multiple execution units, namely a branch unit 206, two fixed-point execution units (FXU) 208*a*, 208*b*, two load/store units (LSU) 207*a*, 207*b*, and two floating-point execution units (FPU) 209*a*, 209*b*. All of the execution units are fully shared across both threads. The processor includes multiple register sets separately for each of the two threads, namely General Purpose Registers (GPR) 210*a*, 210*b*, Floating Point Registers (FPR) 211*a*, 211*b*, and Special Purpose Registers (SPR) 212*a*, 212*b*. The processor additionally includes a set of SPRs, which is shared across both threads 212*c*. A simplified internal bus structure 217 is shown to depict connections between the execution units and the register sets.

FPU 209*a* and FPU 209*b* input their register source operand information from and output their destination register operand data to FPRs 211*a*, 211*b* according to which thread each executing instruction belongs. FXU 208*a*, FXU 208*b*, LSU 207*a*, and LSU 207*b* input their register source operand information from and output their destination register operand data to GPRs 210*a*, 210*b* according to which thread each executing instruction belongs. A subset of instructions executed by FXU 208*a*, FXU 208*b*, and Branch Unit 206 use SPRs 212*a*, 212*b*, 212*c* as source and destination operand registers. LSU 207*a* and LSU 207*b* input their storage operands from and output their storage operands to a Data Cache 202, which stores operand data for multiple programs (threads). Data cache 202 also has an interface to a second level cache and memory 220.

In response to the instructions input from instruction cache 201 and decoded by instruction decode unit 204, IDU 205 selectively dispatches the instructions to selected ones of execution units 206, 207a, 207b, 208a, 208b, 209a, 209b. Each execution unit executes one or more instructions of a particular class of instructions. For example, FXU 208a and FXU 208b execute fixed-point mathematical operations on register source operands, such as addition, subtraction, ANDing, ORing and XORing. FPU 209a and FPU 209b execute floating-point mathematical operations on register source operands, such as floating-point multiplication and division. LSU 207a and LSU 207b execute load and store instructions that move operand data between Data Cache 202 and registers 210a, 210b, 211a, 211b. Branch unit 206 executes branch instructions that conditionally alter the flow of execution through a program by modifying the Instruction Address used by the IFU 203 to request instructions from the Instruction cache 201.

IDU 205 groups together decoded instructions to be executed at the same time, depending on the mix of decoded instructions and the available execution circuitry to perform the required operation for each instruction. For example, because there are only two Load/Store units 207a, 207b, a maximum of two Load/Store type instructions may be grouped together. In the depicted example, up to seven instructions may be grouped together (two Fixed-Point arithmetic, two Load/Store, two Floating-point arithmetic, and one branch), and up to five instructions may belong to the same thread.

An Instruction Completion Unit 216 monitors the internal bus structure 217 to determine when instructions executing in the various execution units 206, 207a, 207b, 208a, 208b, 209a, 209b are finished writing their operand results. Instructions executed by the Branch unit 206, FXU 208a, FXU 208b, LSU 207a, and LSU 207b require the same number of cycles to execute, while instructions executed by FPU 209a and FPU 209b require a variable, and larger number of cycles to execute. Therefore, instructions that are grouped together and start executing at the same time do not necessarily finish executing at the same time. When all the instructions grouped together within a thread are finished writing their operand results, the group is said to be "completed."

The instruction completion unit 216 monitors for the completion of instruction, and sends control information 219 to the IDU 205 to identify that more groups of instructions can be dispatched to the execution units. The IDU 205 sends control information 225 to the IFU 203 and instruction decode unit 204 to indicate that it is ready to receive more decoded instructions.

The processor in the preferred embodiment includes error detection circuitry, which is part of pervasive logic 221, throughout all functional units, and a Recovery Unit 215, which contains a backup copy of all registers for all threads. Results written to the register sets 210a, 210b, 211a, 211b, 212a, 212b, 212c are also written to queue structures 213a, 213b, 214a, 214b over the internal bus structure 217. Register results from the Branch unit 206, FXU 208a, FXU 208b, LSU 207a, and LSU 207b are held in a Write Queue 213a, 213b according to which thread the associated instruction belongs to. The write queue 213a, 213b for each thread is a simple First-In-First-Out (FIFO) queue structure. Because instructions executed by FPU 209a and FPU 209b require a variable, and larger number of cycles to execute, these results are written to a FPR Reorder Buffer 214a, 214b according to which thread the associated instruction belongs. The FPR reorder buffer 214a, 214b for each thread arranges the results from FPU 209a and FPU 209b in the sequence, which the associated instructions occurred in the program originally supplied by the Instruction cache 201.

The register results are held in the write queue 213a, 213b and FPR reorder buffer 214a, 214b for each thread until the completion unit 216 indicates (via control 219) that all instructions in the group have completed for each thread. If no errors are reported by the error detection circuitry, the results are drained from the queue structures 213a, 213b, 214a, 214b into the backup copy of the associated registers in the recovery unit 215. In the event of an error, the recovery unit 215 discards the contents of the write queue 213a, 213b and FPR reorder buffer 214a, 214b for each thread, and restores the backup copy of all register sets 210a, 210b, 211a, 211b, 212a, 212b, 212c using the internal bus structure 217. Processing may then be resumed from the known error-free instruction boundary.

The error detection circuitry that is part of pervasive logic 221 may include circuitry for detecting hang conditions. A core hang may occur due to flaws in the microprocessor design or problems in software. A core hang may be detected using a timer. When an instruction for a thread begins execution and the timer expires before the instruction completes execution, then a core hang may be responsible.

A memory hang may occur when a thread has a pending transaction with an external device, such as a memory, a hard disk, or the like. If a problem exists with the external device, then a thread may hang. A memory hang may be detected using a timer with a longer limit. When an instruction for a thread begins execution and the timer with the longer limit expires before the instruction completes execution, then a memory hang may be responsible.

Therefore, one may set the timer to the core hang limit when a thread does not have an external transaction pending and set the timer to the memory hang limit when the thread does have an external transaction pending. However, a problem arises when two threads share one or more resources. Resources that may be shared in components of the processor 200 include IFU 203, IDU 204, Instruction Dispatch Unit 205, Branch Unit 206, LSUs 207a, 207b, FPUs 208a, 208b, FXUs 209a, 209b, and special purpose registers 212c, for example. When one thread accesses a shared resource, that thread is said to "block" the resource. If a second thread attempts to access the shared resource, then the second thread is "blocked" until the first thread releases the resource. This is referred to as "contention."

If a thread is waiting for a blocked resource, but does not have a pending external transaction, the thread may be falsely detected as having a core hang. The thread that is blocking the resource may have a hang condition itself or may have a pending external transaction. An external transaction typically takes longer than the core hang limit. If the timer reaches the core hang limit before the shared resource is released, then a core hang may be detected falsely. That is, a core hang may be detected when no such hang condition exists or, alternatively, the hang may be detected for the waiting thread when it is the blocking thread that has the hang condition.

In accordance with one exemplary embodiment of the present invention, pervasive logic 221 includes logic that determines whether a thread is waiting to access a blocked resource. If a thread has an external transaction pending, then the timer uses the memory hang limit. If the thread does not have an external transaction pending and is not waiting for a blocked resource, then the core hang limit is used. However, if the thread is waiting for a blocked resource, then the timer uses the memory hang limit to cover the situation where the blocking thread may block the resource during an external memory transaction or where the blocking thread may have a hang condition itself.

In accordance with another exemplary embodiment of the present invention, pervasive logic 221 includes logic that determines whether a thread is waiting to access a blocked resource and determines whether another thread has an external transaction pending. If the thread is waiting for a blocked resource and another thread has an external transaction pending, then the timer uses the memory hang limit to cover the situation where the blocking thread may block the resource during an external memory transaction or where the blocking thread may have a hang condition itself. In yet another exemplary embodiment, pervasive logic 221 determines whether a thread is waiting to access a blocked resource and, more specifically, whether the blocking thread has an external transaction pending. Pervasive logic 221 may also determine whether a thread is waiting to access a blocked resource and whether the resource is blocked due to an external transaction. Therefore, a thread may only use the longer memory hang limit if the thread has an external transaction pending or if the thread is waiting for a blocked resource and the blocking thread has an external transaction pending.

Figure 3:
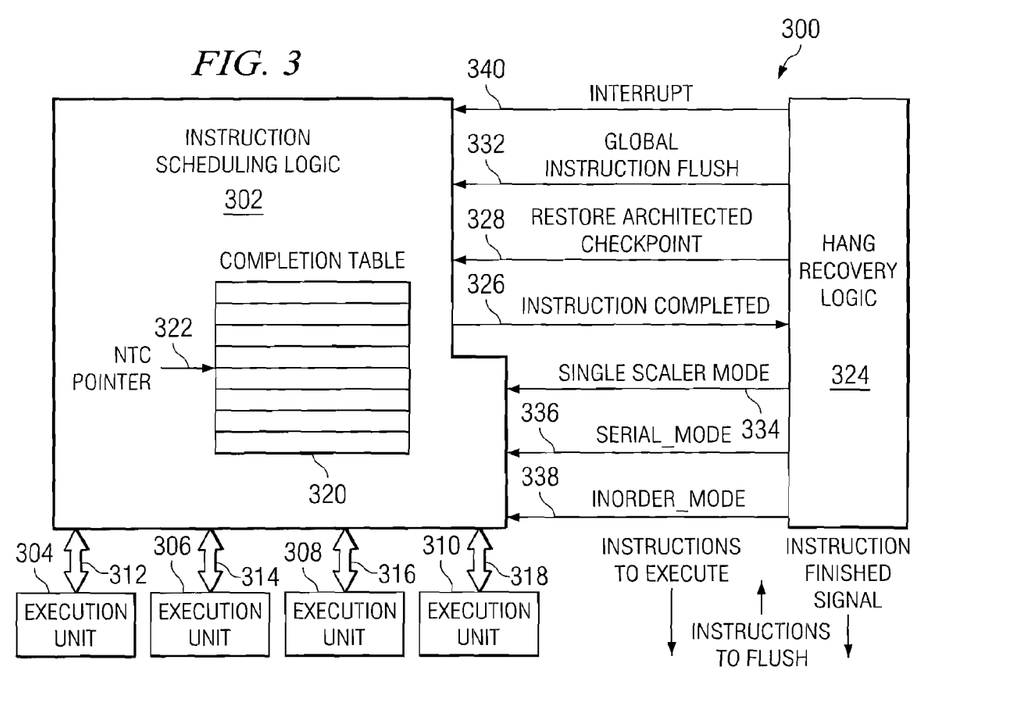
FIG. 3 is a diagram of a portion of a processor core in accordance with a preferred embodiment of the present invention.

With reference next to FIG. 3, a diagram of a portion of a processor core is depicted in accordance with a preferred embodiment of the present invention. Section 300 illustrates a portion of a processor core for a processor, such as processor 102 in FIG. 1 or processor 200 in FIG. 2. Only the components needed to illustrate the present invention are shown in section 300. Other components are omitted in order to avoid obscuring the exemplary aspects of the present invention.

In section 300, instruction scheduling logic 302 schedules and dispatches instructions to execution units 304-310. Instruction scheduling logic 302 may also be referred to as an instruction dispatcher. Execution units 304-310 include execution units, such as fixed-point units (FXUs), floating point units (FPUs), and load/store units (LSUs). Of course, these execution units may include other types of execution units depending on the implementation. Only four execution units are shown for the purpose of illustration and other numbers of execution units may be present. Further, multiple execution units of the types mentioned are present for superscaler processing.

Instruction scheduling logic 302 communicates with execution units 304-310. In general, instruction scheduling logic 302 is able to send instructions to an execution unit or commands to flush instructions present in that execution unit via bus 312-318. In response, an execution unit may return an instruction complete signal to indicate when an execution of an instruction has been completed. Completion of execution of these instructions are tracked by instruction scheduling logic 302 in completion table 320 using next to complete (NTC) pointer 322. This pointer points to the instruction that is next instruction to be completed.

Hang recovery logic 324 is coupled to instruction scheduling logic 302 to provide a hang recovery mechanism. Hang recovery logic 324 receives signals indicating instruction completion through line 326. Instruction scheduling logic 322 will send an instruction completion signal each time an instruction has completed. This signal is used by hang recovery logic 324 to determine whether a hang situation has occurred. If instruction scheduling logic 302 hangs, various signals may be sent to provide hang recovery. The hang of the processor core is sometimes located in the instruction scheduling logic and other times may be in the execution unit itself. When the execution unit hangs, the instruction scheduling logic fails to receive an instruction complete signal from the execution unit, and, thus, the instruction scheduling logic stops making forward progress in issuing or completing instructions.

In this example, a global flush signal may be sent on line 328 as a low priority flush attempt in response to a hang condition in the processor core. A recover from checkpoint signal may be sent on line 332 to perform a complete reset of the core architected state if the first hang recovery attempt did not break the hang.

The mode of processor performance may be changed using hang recovery logic 324. In these examples, the mode is changed through lines 334-338, which are used to implement a single scalar mode, a serial mode, and an in-order mode in these examples. Further, an interrupt may be generated across line 340 to allow software intervention to clean up the hang condition. This software recovery may include, for example, terminating the process that contained the problem code stream that caused the hang without crashing the entire system.

Figure 4:
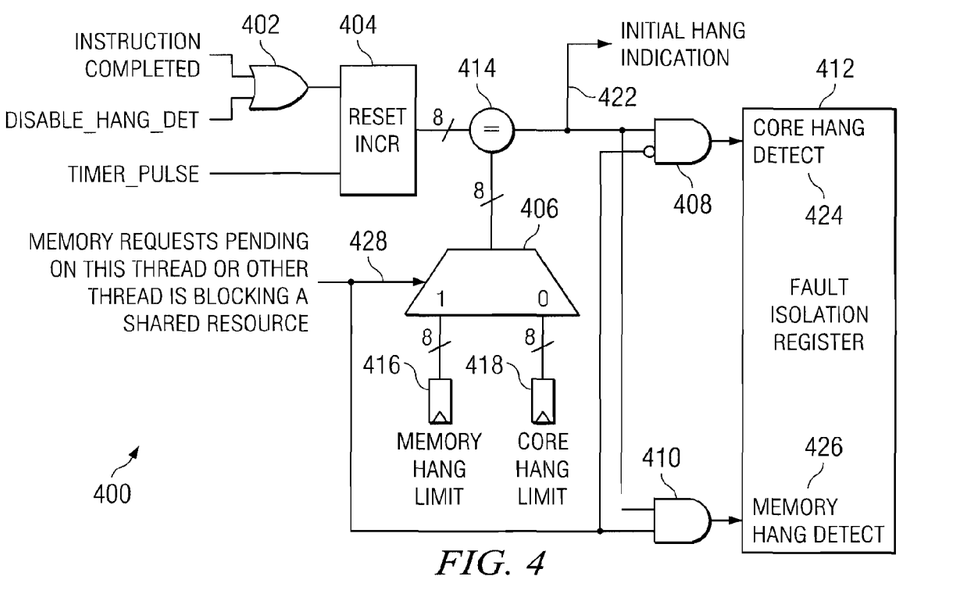
FIG. 4 is a block diagram of a core thread hang detect unit in accordance with a preferred embodiment of the present invention.

With reference now to FIG. 4, a block diagram of a core hang detect unit is depicted in accordance with a preferred embodiment of the present invention. Hang detect unit 400 is used to detect hang conditions and may be located in hang recovery logic 324 in FIG. 3. There may be a hang recovery logic unit 324 for each thread supported in the processor. Similarly, there may be a hang detect unit 400 for each thread supported in the processor. If a processor has not completed an instruction at the end of N timer pulses, hang detect unit 400 will activate the hang recovery logic. These timer pulses may be generated from a tunable source, such that hang core detect unit 400 is able to monitor for completion of instructions and indicate when an unacceptable amount of time has expired since the last instruction completion.

In this example, hang detect unit 400 includes OR gate 402, incrementer 404, multiplexer 406, AND gate 408, and AND gate 410, fault isolation register 412, comparator 414, memory hang limit 416, and core hang limit 418. Core hang limit 418 is used to detect a hang based on only instructions that stay internal to units within the core, such as fixed-point and floating-point execution units. Memory hang limit 418 (nest hang limit) is larger and is set to a timeout value of the maximum latency through the system, which is generally through several support chips to take care of the longest load and store operations.

An instruction complete signal is received at OR gate 402. This instruction complete signal may be received from line 326 in FIG. 3. This signal is sent into incrementer 404 unless the function has been disabled by application of disable_hang_det_signal to OR gate 402. Incrementer 404 increments each time a signal, such as timer_pulse is applied to incrementer 404. The count contained in incrementer 404 is reset each time a logic "1" signal is received from OR gate 402. Incrementer 404 sends a value to comparator 414. The value from incrementer 404 is compared with a value received from multiplexer 406.

The value output by multiplexer 406 may be memory hang limit 416 or core hang limit 418. Different limits are set to account for conditions in which an instruction requires accessing memory. Such a situation often takes more time than just executing an instruction. This limit is selectable to avoid falsely indicating a hang condition when memory is being accessed. If memory hang select signal 428 is a logic "1," memory hang limit 416 is selected. In this example, a pending memory request may be present when a load or store misses the cache in the processor core. Core hang limit 418 is selected when memory hang select signal 428 is a logic "0."

In accordance with one exemplary embodiment of the present invention, memory hang select signal 428 is asserted if the thread has an external transaction pending or if the thread is waiting for a blocked resource. In accordance with another exemplary embodiment of the present invention, memory hang select signal 428 is asserted if the thread is waiting for a blocked resource and another thread has an external transaction pending. In yet another exemplary embodiment, memory hang select signal 428 is asserted if the thread is waiting for a blocked resource and the blocking thread has an external transaction pending. Memory hang select signal 428 may also be asserted if the thread is waiting for a blocked resource and the resource is blocked due to an external transaction. Memory hang select 428 may be asserted or deasserted by logic in pervasive logic 221 in FIG. 2, for example.

If the output from multiplexer 406 equals that of incrementer 404, an initial hang indication 422 is generated. In addition, the signal is sent to AND gate 408 and AND gate 410. These AND gates generate core detect indication 424 and memory hang detect indication 426, respectively. The AND gates are selectively enabled and disabled by memory request pending signal 428, which also is used to select a limit using multiplexer 406.

Figure 5:
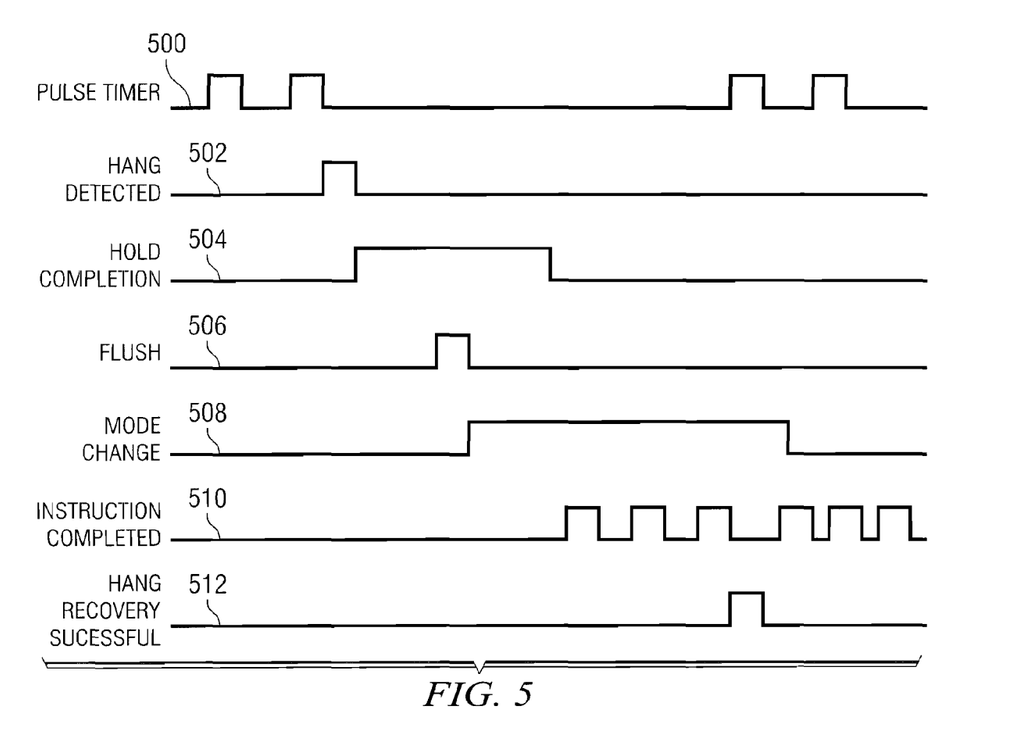
FIG. 5 is a timing diagram illustrating a flush process in accordance with a preferred embodiment of the present invention.

With reference now to FIG. 5, a timing diagram illustrating a flush process is depicted in accordance with a preferred embodiment of the present invention. Pulse timer signal 500 illustrates the timer signal applied to incrementer 404 in FIG. 4. Hang detected signal 502 is a hang detect indication, such as core hang detect indication 424 or memory hang detect indication 426 in FIG. 4. A logic "1" in hang detected signal 502 indicates that a hang condition is present. Hold completion signal 504 is used to momentarily hold the dispatch of instructions and/or the completion of instructions during the flush operation in order to prevent confusing the instruction scheduling logic. This operation occurs when hold completion 504 is a logic "1." Hold completion signal 504 is communicated across line 430 in FIG. 4.

Global Flush signal 506 causes a flush process to occur when this signal is a logic "1". Mode change signal 508 is used to change the mode in which the processor executes instructions. This change in mode occurs when mode change signal 508 is a logic "1." In the depicted examples, three different types of mode changes may occur: a single scalar mode, a serial mode, and an in-order mode. The type of mode that occurs may be set by a mode bit within hang recovery logic 324 in FIG. 3. The signals are sent through lines 334-338 in FIG. 3.

Single scalar mode causes the processor core to issue a single instruction for execution during each cycle when mode change signal 508 is a logic "1." This signal is used to avoid some types of problematic dependencies between instructions that occur at time of issue. In the serial mode, the processor executes and completes an instruction before issuing the next instruction. This mode is necessary to remove dependencies that occur while executing instructions at the same time. In the in-order mode, multiple instructions may be sent for execution, but the instructions are dispatched in order. This mode is used to avoid problems that arise with out of order issue of instructions. These different mode signals also may be set by a mode bit within hang recovery logic 324 in FIG. 3.

Instructions completed signal 510 is a logic "1" each time an instruction is completed. Hang recovery successful signal 512 is a logic "1" when a successful hang recovery has occurred. This signal is used as an internal indication to perform various actions within the hang recovery logic. Specifically, mode change signal 508 will not change to a logic "0" to return the processor to a normal mode until a successful hang recovery has occurred, as indicated by hang recovery successful signal 512. These actions are described in more detail below.

In the depicted examples, pulse timer signal 500 actually occurs at regular time intervals. A longer interval between pulses is present in order to illustrate other signals occurring between pulses in pulse timer signal 500. In other words, a change in scale is illustrated, rather than a change in the time between pulses in pulse timer signal 500. In these examples, hang recovery successful signal 512 occurs after a programmable number of instructions (or instruction groups) have been successfully completed, as indicated by instruction complete signal 510. Although only a few timer pulses are shown before hang detect signal 502 generates a logic "1," many cycles may occur in actuality. Further, the number of instructions or instruction groups completed in the different modes may occur over many cycles depending on the implementation. In addition, for a core with a Recovery Unit for example, the periodic processor checkpoint (of architected state) could be used in the place of instruction completion to indicate forward progress.

Figure 6:
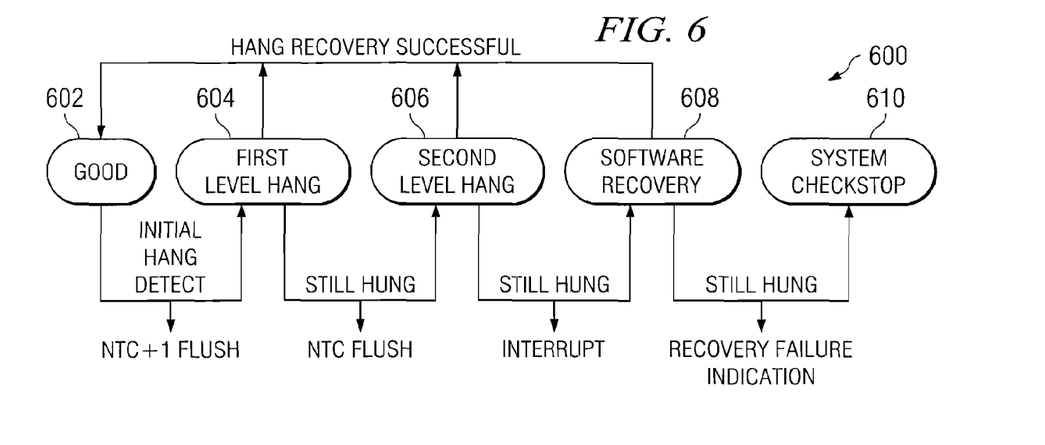
FIG. 6 is a state machine for a hang recovery logic unit in accordance with a preferred embodiment of the present invention.

With reference now to FIG. 6, a state machine for a hang recovery logic unit is depicted in accordance with a preferred embodiment of the present invention. Once a processor hang has been detected, a flush (which causes an instruction cancel and re-fetch) may be attempted to clear the hang. Two levels of recovery from hang are present in the present invention and implemented in state machine 600. The first level may be programmed to attempt a global flush or "mini-refresh" from RU checkpoint. The second level is more aggressive and will reset the entire state of the core and restore the previously checkpointed state.

State machine 600 in this example begins in state 602, which indicates a good execution state. In this state, a hang condition has not been detected. In response to an initial hang detect, state machine 600 shifts to state 604, which is a first level hang state. In shifting to this state, a global flush is sent to the instruction schedule logic. All the instructions currently being processed or are trying to complete are flushed.

In the depicted examples, the processor is given a full hang limit duration in which to begin completing instructions again. In particular, a hang is considered recovered if a selected number of groups of instructions or instructions complete before the hang limit duration expires. If the hang condition goes away, as indicated by a hang recovery successful indication, state machine 600 returns to state 602. In returning to this state, the processor is returned to a normal processing mode if the mode was changed previously.

If a hang condition is still present, state machine 600 then shifts from state 604 to state 606, which is a second level hang state. In shifting to this state, a core recovery reset is initiated. This resets the entire state of the core and restores a known good, previously checkpointed architected state. The hang condition is considered recovered as described above.

If the hang condition clears, state machine 600 returns to state 602. The transition to state 602 is caused by a hang recovery successful indication. If a programmable number of instructions have completed since the transition to the state, then the hang has been successfully recovered from and a transition back to state 602 may occur. Upon transition back to state 602, the system is placed back into a full performance mode. If the programmable number of instructions has not completed and another timer pulse occurs, the system is still considered in a hang state.

On the other hand, if the hang condition persists, state machine 600 shifts to state 608, which is a software recovery state. In shifting to this state, an interrupt is produced to allow software intervention to clean up the hang condition. This software recovery may include, for example, terminating the process that contained the problem code stream that caused the hang without crashing the entire system. If the hang condition is cleared, the state machine returns to state 602. Otherwise, if the hang condition is still present, state machine 600 shifts to state 610, indicating that the hang recovery has failed, which is a system check stop state. In some cases the flushes may not be able to break the hang condition, but an interrupt may be able to break this condition and allow some form of software recovery.

Depending on the implementation, instead of shifting to state 606 from state 604, state machine 600 may shift directly to state 608 or state 610. Alternatively, a signal may be sent to request assistance from an external service processor in any of these states. In some cases the instruction scheduling logic is unable to perform a flush without corrupting the architected state of the processor. In such cases, the flush operation may be ignored by the instruction scheduling unit. In other implementations, the instructions scheduling unit may communicate to the hang recovery unit indicating when it is safe or not safe to perform the flush operations.

Figure 7:
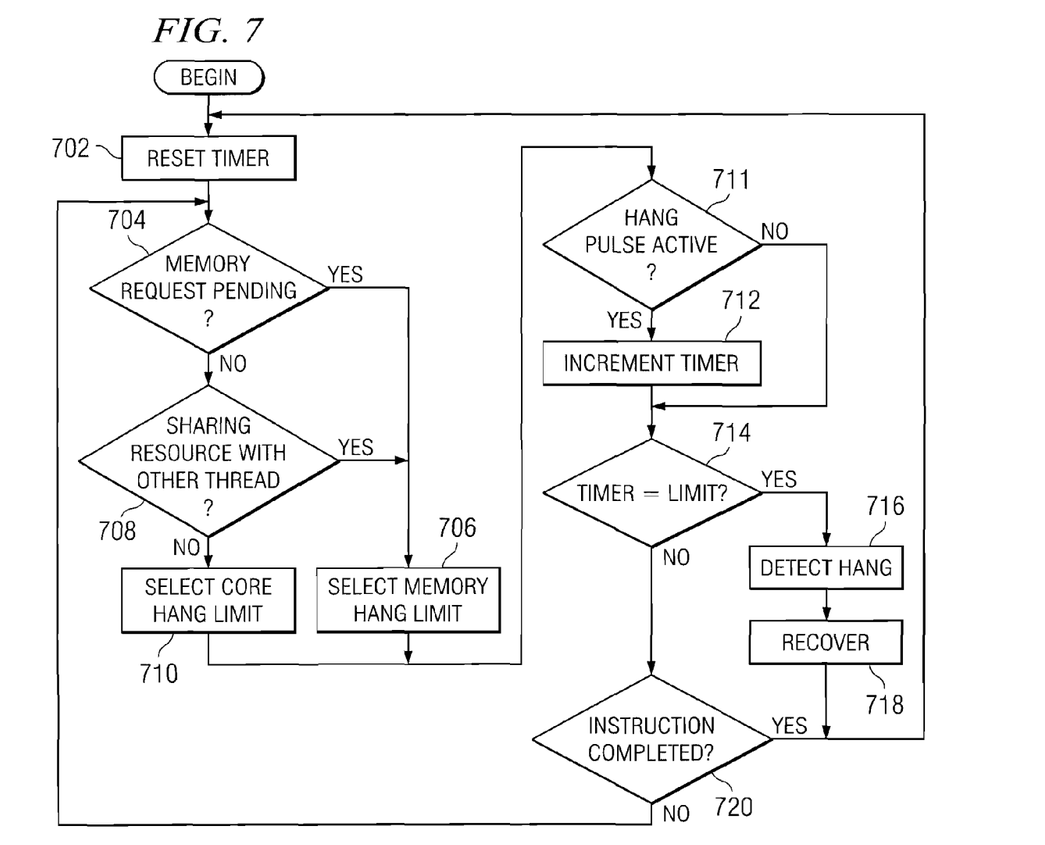
FIGS. 7 and 8 are flowcharts illustrating the operation of hang detect logic in accordance with exemplary embodiments of the present invention.
Figure 8:
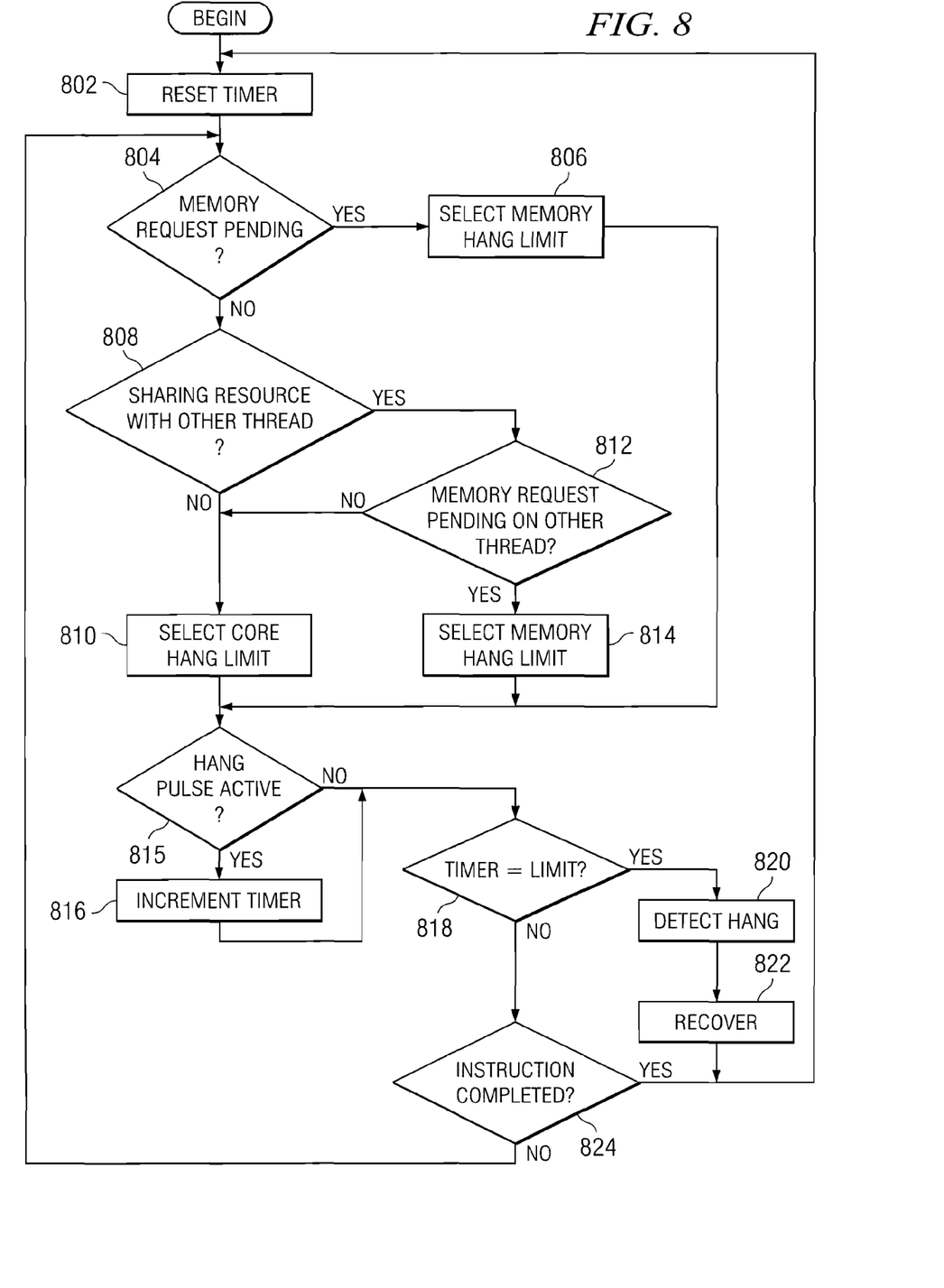

FIGS. 7 and 8 are flowcharts illustrating the operation of hang detect logic in accordance with exemplary embodiments of the present invention. More particularly, with reference to FIG. 7, in one exemplary embodiment, operation begins and the timer is reset (block 702). Next, a determination is made as to whether the corresponding thread has a memory request (external transaction) pending (block 704). If the thread has a memory request pending, the memory hang limit is selected (block 706). If the thread does not have a memory request pending in block 704, a determination is made as to whether the thread is sharing a resource that is blocked by another thread (block 708). If the thread is sharing a resource that is blocked by another thread, then the memory hang limit is selected (block 706); otherwise, the core hang limit is selected (block 710).

After the hang limit is selected in block 706 or block 710, a determination is made as to whether the hang pulse is active (block 711). If the hang pulse is active, the hang detect logic increments the timer (block 712) and a determination is made as to whether the timer has reached the selected limit (block 714). Otherwise, if the hang pulse is not active in block 711, operation proceeds directly to block 714 to determine whether the time has reached the selected limit. If the timer has reached the limit, the hang detect logic detects a hang (block 716) and performs a recovery operation (block 718). Thereafter, operation returns to block 702 to reset the timer.

If the timer does not reach the limit in block 714, a determination is made as to whether the instruction has completed (block 720). If the instruction has not completed, operation returns to block 704 to determine whether a memory request is pending. If the instruction has completed in block 720, operation returns to block 702 to reset the timer.

With reference now to FIG. 8, in another exemplary embodiment, operation begins and the timer is reset (block 802). Next, a determination is made as to whether the corresponding thread has a memory request (external transaction) pending (block 804). If the thread has a memory request pending, the memory hang limit is selected (block 806). If the thread does not have a memory request pending in block 804, a determination is made as to whether the thread is sharing a resource that is blocked by another thread (block 808). If the thread is not sharing a resource that is blocked by another thread, then the core hang limit is selected (block 810).

If the thread is sharing a resource that is blocked by another thread, then a determination is made as to whether a memory request is pending on another thread in the processor (block 812). More specifically, the hang detect logic may determine whether the blocking thread in particular has a memory request pending. If a memory request is pending in another thread or, more specifically, the blocking thread, then the memory hang limit is selected (block 814); otherwise, the core hang limit is selected (block 810).

After the hang limit is selected in block 806, block 810, or block 814, a determination is made as to whether a hang pulse is active (block 815). If the hang pulse is active, the hang detect logic increments the timer (block 816) and a determination is made as to whether the timer has reached the selected limit (block 818). Otherwise, if the hang pulse is not active in block 815, operation proceeds directly to block 818 to determine whether the timer has reached the selected limit. If the timer has reached the limit, the hang detect logic detects a hang (block 820) and performs a recovery operation (block 822). Thereafter, operation returns to block 802 to reset the timer.

If the timer does not reach the limit in block 818, a determination is made as to whether the instruction has completed (block 824). If the instruction has not completed, operation returns to block 804 to determine whether a memory request is pending. If the instruction has completed in block 824, operation returns to block 802 to reset the timer.

Thus, the present invention solves the disadvantages of the prior art by providing two hang limits per thread. One limit is short (core hang limit) and is used to detect a hang based on only instructions that stay internal to units within the core, such as fixed-point and floating-point execution units. The other limit (memory or nest hang limit) is larger and is set to a timeout value of the maximum latency through the system, which is generally through several support chips to take care of the longest load and store operations to either memory or external I/O devices. The timer is reset when an instruction completes.

In accordance with exemplary aspects of the present invention, each thread collects its own external operation pending information, but also has external operation pending information of other threads running on the same processor core. Thus, the hang detect logic of the present invention reduce false detections and more accurately determines which thread causes a hang condition.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for detecting a hang condition in a multithreading processor, the apparatus comprising:

said processor executing threads on a plurality of execution units, the plurality of execution units shared among the threads, the plurality of execution units including a fixed-point unit, a floating point unit, and a load/store unit;

the processor including instruction scheduling logic that schedules and dispatches instructions to the plurality of execution units;

hang recovery logic coupled to the instruction scheduling logic to provide a hang recovery mechanism;

including, in said hang recovery logic, a separate hang detect unit for each one of said threads, said hang recovery logic included for one of said threads detecting said hang condition when execution of an instruction for said one of said threads fails to complete;

the instruction scheduling logic sending to the hang recovery logic a completion signal every time said instruction has completed;

a failure of the instruction scheduling logic to send the completion signal indicating the hang condition in at least one of the processor, the fixed-point unit, the floating point unit, and the load/store unit;

each hang detect unit including an OR gate, an incrementer, a multiplexer, a first AND gate, a second AND gate, a fault isolation register, and a comparator;

the OR gate receiving the completion signal every time said instruction has completed;

the OR gate capable of receiving a disable hang detect signal;

the OR gate sending to the incrementer the completion signal unless the OR gate has received the disable hang detect signal;

means for incrementing a count in the incrementer each time a timer pulse signal is applied to the incrementer;

means for resetting the count in the incrementer each time the incrementer receives the completion signal from the OR gate;

the multiplexer having a first input for receiving a first hang limit and a second input for receiving a second limit;

the first hang limit and the second hang limit operating independently from each other;

the first hang limit being shorter than the second hang limit, the second hang limit set to a timeout value of the maximum latency through the data processing system;

the multiplexer receiving a memory request pending signal, the multiplexer outputting the first hang limit as a selected limit if the memory request pending signal is a logic zero, and outputting the second hang limit as the selected limit if the memory request pending signal is a logic one;

means for using the first hang limit to detect a hang that is based on only instructions that stay internal to the plurality of execution units;

the incrementer outputting the count to the comparator;

the comparator comparing the selected limit to the count;

the comparator generating an initial hang indication responsive to the selected limit equaling the count;

said first AND gate and said second AND gate receiving the initial hang indication;

said first AND gate generating a core hang detect indication;

said second AND gate generating a memory hang detect indication;

means for enabling and disabling the first and second AND gates using the memory request pending signal, wherein the first AND gate is enabled when the memory request pending signal is a logic zero and the second AND gate is enabled when the memory request pending signal is a logic one;

the fault isolation register receiving the core hang detect indication when the memory request pending signal is a logic zero and the memory hang detect indication when the memory request is a logic one;

in a first hang detect unit included in said hang recovery logic for a first thread:

the memory request pending signal outputting a logic one when the first thread has a pending transaction with a memory that is external to the processor, wherein the second hang limit becomes the selected limit;

if the first thread does not have a pending transaction with the memory:

the first hang detection logic determining if the first thread is in a blocked condition as a result of a blocking thread, the first thread is in the blocked condition when the first thread attempts to access a particular one of the plurality of execution units that is already being accessed by the blocking thread;

the first hang detection logic determining if the blocking thread has a pending transaction with the memory; and the memory request pending signal outputting a logic one when the first thread is in the blocked condition and the blocking thread has a pending transaction with the memory, wherein the second hang limit becomes the selected limit;

the memory request pending signal outputting a logic zero when the first thread does not have a pending transaction with the memory and the first thread is not in the blocked condition, wherein the first hang limit becomes the selected limit;

responsive to an instruction pending in the processor for the first thread, means for starting a first count in the incrementer by applying the timer pulse to the incrementer;

responsive to the first count reaching the selected limit before the instruction completes, means for identifying said hang condition in the processor; and responsive to identifying the hang condition, means for performing a recovery operation.

2. The apparatus of claim 1, wherein the recovery operation includes flushing one or more instructions in the multi-threading processor.

3. The apparatus of claim 1, wherein the recovery operation includes resetting the processor and restoring the processor to a previously checkpointed architected state.

4. A method, in a data processing system, for detecting a hang condition in a multi-threading processor that includes a processor core, the method comprising:

i. executing, by said processor core, threads on a plurality of execution units, wherein the plurality of execution units are shared among the threads, and wherein the plurality of execution units includes a fixed-point unit, a floating-point unit, and a load/store unit;

ii. including, in a hang recovery unit, a separate hang-detect unit for each one of said threads;

iii. receiving, by the hang recovery unit, a core hang limit and a resources hang limit, wherein the core hang limit and the resources hang limit are not used concurrently, wherein the core hang limit is used to detect a hang as a result of instructions that are processed only internally in the processor core, and wherein the resources hang limit is used to detect a hang as a result of instructions that are processed by external resources that are external to the processor core;

iv. responsive to an instruction pending in the multi-threading processor, starting a timer;
v. responsive to the timer reaching a selected limit before the instruction completes, identifying a hang condition in the multi-threading processor;
vi. determining, by a first hang-detect unit that is associated with only a first thread, whether the first thread being processed by the processor core is in a blocked condition, wherein the first thread is in the blocked condition when the first thread attempts to access a particular one of the plurality of execution units that is already being accessed by a blocking thread, and wherein the blocking thread is associated with only a blocking hang detect unit;
vii. responsive to determining that the first thread is in the blocked condition, using the resources hang limit as the selected limit; and
viii. performing a recovery operation responsive to identifying the hang condition.

5. The method of claim 4, wherein the recovery operation includes flushing one or more instructions in the multi-threading processor.

6. The method of claim 5, wherein the recovery operation includes resetting the processor and restoring the processor to a previously checkpointed architected state.

7. The method of claim 4, wherein the resources hang limit is longer than the core hang limit.

8. The method of claim 4, wherein the resources hang limit is set to a timeout value of a maximum latency through the data processing system.

9. The method of claim 4, further comprising:
determining, by the first hang detection logic, if the blocking thread has a pending transaction with the memory; and
using the resources hang limit as the selected limit when the first thread is in the blocked condition and the blocking thread has a pending transaction with the memory.

10. The method of claim 4, further comprising:
wherein the processor core includes instruction scheduling logic that schedules and dispatches instructions to the plurality of execution units;
wherein the processor core includes the hang recovery logic coupled to the instruction scheduling logic to provide a hang recovery mechanism;
sending, by the instruction scheduling logic, a completion signal to the hang recovery logic every time said instruction has completed;
wherein a failure of the instruction scheduling logic to send the completion signal indicates the hang condition in at least one of the processor, the fixed-point unit, the floating point unit, and the load/store unit;
wherein each hang detect unit includes an OR gate, an incrementer, a multiplexer, a first AND gate, a second AND gate, a fault isolation register, and a comparator;
receiving, by the OR gate, the completion signal every time said instruction has completed;
wherein the OR gate is capable of receiving a disable hang detect signal;
sending, by the OR gate to the incrementer, the completion signal unless the OR gate has received the disable hang detect signal;
incrementing a count in the incrementer each time a timer pulse signal is applied to the incrementer;
resetting the count in the incrementer each time the incrementer receives the completion signal from the OR gate;
receiving, by a first input included in the multiplexer, the core hang limit;
receiving, by a second input included in the multiplexer, the resources hang limit;
wherein the core hang limit is shorter than the resources hang limit, and wherein the resources hang limit is set to a timeout value of the maximum latency through the data processing system;
receiving, by the multiplexer, a memory request pending signal, the multiplexer outputting the core hang limit as the selected limit if the memory request pending signal is a logic zero, and outputting the resources hang limit as the selected limit if the memory request pending signal is a logic one;
outputting, by the incrementer, the count to the comparator;
comparing, by the comparator, the selected limit to the count;
generating, by the comparator, an initial hang indication responsive to the selected limit equaling the count;
receiving the initial hang indication by said first AND gate and said second AND gate, wherein said first AND gate generates a core hang detect indication, and wherein said second AND gate generates a memory hang detect indication;
enabling and disabling the first and second AND gates using the memory request pending signal, wherein the first AND gate is enabled when the memory request pending signal is a logic zero and the second AND gate is enabled when the memory request pending signal is a logic one;
receiving, by the fault isolation register, the core hang detect indication when the memory request pending signal is a logic zero and the memory hang detect indication when the memory request is a logic one;
in the first hang detect unit included in said hang recovery logic for the first thread:
outputting, by the memory request pending signal, a logic one when the first thread has a pending transaction with a memory that is external to the processor, wherein the resources hang limit becomes the selected limit;
in response to a determination that the first thread does not have a pending transaction with the memory:
executing the determination step to determine, by the first hang detection logic, if the first thread is in the blocked condition
determining, by the first hang detection logic, if the blocking thread has a pending transaction with the memory; and
outputting, by the memory request pending signal, a logic one when the first thread is in the blocked condition and the blocking thread has a pending transaction with the memory, wherein the resources hang limit becomes the selected limit;
outputting, by the memory request pending signal, a logic zero when the first thread does not have a pending transaction with the memory and the first thread is not in the blocked condition, wherein the core hang limit becomes the selected limit;
responsive to an instruction pending in the processor for the first thread, starting a first count in the incrementer by applying the timer pulse to the incrementer;
responsive to the first count reaching the selected limit before the instruction completes, identifying said hang condition in the processor; and
responsive to identifying the hang condition, performing a recovery operation.

11. An apparatus, in a data processing system, for detecting a hang condition in a multi-threading processor that includes a processor core, the apparatus comprising:
- ix. said processor core executing threads on a plurality of execution units, wherein the plurality of execution units are shared among the threads, and wherein the plurality of execution units includes a fixed-point unit, a floating point unit, and a load/store unit;
- x. a separate hang-detect unit included in a hang recovery unit for each one of said threads;
- xi. the hang recovery unit receiving a core hang limit and a resources hang limit, wherein the core hang limit and the resources hang limit are not used concurrently, wherein the core hang limit is used to detect a hang as a result of instructions that are processed only internally in the processor core, and wherein the resources hang limit is used to detect a hang as a result of instructions that are processed by external resources that are external to the processor core;
- xii. a timer that is started responsive to an instruction pending in the multi-threading processor;
- xiii. responsive to the timer reaching a selected limit before the instruction completes, the hang recovery unit identifying a hang condition in the multi-threading processor;
- xiv. a first hang detect unit that is associated with only a first thread determining whether the first thread being processed by the processor core is in a blocked condition, wherein the first thread is in the blocked condition when the first thread attempts to access a particular one of the plurality of execution units that is already being accessed by a blocking thread, and wherein the blocking thread is associated with only a blocking hang detect unit;
- xv. responsive to determining that the first thread is in the blocked condition, the resources hang limit being the selected limit; and
- xvi. a recovery operation that is performed responsive to the hang recovery unit identifying the hang condition.

* * * * *